United States Patent
Olmstead et al.

(10) Patent No.: US 11,661,331 B1
(45) Date of Patent: May 30, 2023

(54) CLOUD-CONNECTED SMART SENSING AND MEASUREMENT METHOD FOR RESOURCE DISPENSERS

(71) Applicant: Zurn Industries, LLC, Milwaukee, WI (US)

(72) Inventors: Brian Olmstead, Milwaukee, WI (US); Brandon Feil, Milwaukee, WI (US); Kevin Brockman, Milwaukee, WI (US); Kevin Ferenc, Milwaukee, WI (US); Arindam Chakraborty, Milwaukee, WI (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 17/820,161

(22) Filed: Aug. 16, 2022

Related U.S. Application Data

(63) Continuation of application No. 17/538,461, filed on Nov. 30, 2021, now Pat. No. 11,414,314.

(51) Int. Cl.
  *B67D 3/00* (2006.01)
  *G01F 23/80* (2022.01)
  *H04L 67/125* (2022.01)

(52) U.S. Cl.
  CPC ......... *B67D 3/0093* (2013.01); *G01F 23/802* (2022.01); *H04L 67/125* (2013.01)

(58) Field of Classification Search
  CPC .... B67D 3/0093; G01F 23/802; H04L 67/125
  See application file for complete search history.

(56) References Cited

U.S. PATENT DOCUMENTS

| | | | |
|---|---|---|---|
| 5,852,946 A | 12/1998 | Cowger | |
| 6,360,181 B1 | 3/2002 | Gemmell et al. | |
| 8,646,656 B2 | 2/2014 | Johnson | |
| 8,786,398 B2 | 7/2014 | Wegelin et al. | |
| 9,645,561 B2 | 5/2017 | Borke et al. | |
| 10,130,221 B2 | 11/2018 | Borke | |
| 10,490,057 B1 | 11/2019 | Malina et al. | |
| 10,532,920 B2 | 1/2020 | Slater et al. | |
| 11,153,945 B1 | 10/2021 | Feil et al. | |
| 11,181,413 B2 | 11/2021 | Kobs | |
| 11,272,815 B2 | 3/2022 | Rospierski et al. | |
| 11,295,271 B2 | 4/2022 | Williams et al. | |
| 11,414,314 B1 * | 8/2022 | Olmstead | G01F 23/802 |
| 2002/0053969 A1 | 5/2002 | Wagner et al. | |
| 2012/0245729 A1 | 9/2012 | Wegelin et al. | |
| 2013/0234855 A1 | 9/2013 | Knighton | |
| 2016/0364685 A1 | 12/2016 | Wass et al. | |

(Continued)

*Primary Examiner* — Frederick C Nicolas
(74) *Attorney, Agent, or Firm* — Michael Best & Friedrich LLP

(57) ABSTRACT

Methods and systems for providing a resource dispenser status for a resource dispenser associated with a facility. One system includes an electronic processor. The electronic processor is configured to receive a set of signals. The electronic processor is also configured to compare a first signal included in the set of signals to a set of thresholds. The electronic processor is also configured to determine a resource dispenser status based on the comparison of the first signal to the set of thresholds. The electronic processor is also configured to generate and transmit the resource dispenser status to a remote device, wherein the remote device provides the resource dispenser status to a user.

20 Claims, 11 Drawing Sheets

(56) References Cited

U.S. PATENT DOCUMENTS

| | | |
|---|---|---|
| 2017/0019970 A1 | 1/2017 | Chemel et al. |
| 2017/0223807 A1 | 8/2017 | Recker et al. |
| 2018/0293877 A1 | 10/2018 | Barth |
| 2019/0335957 A1 | 11/2019 | Hines et al. |
| 2019/0351442 A1 | 11/2019 | McNulty et al. |
| 2020/0140254 A1 | 5/2020 | Slater et al. |
| 2020/0217057 A1 | 7/2020 | Spiro et al. |
| 2021/0027402 A1 | 1/2021 | Davis et al. |
| 2021/0150825 A1 | 5/2021 | Stern et al. |
| 2021/0186296 A1 | 6/2021 | Atias et al. |
| 2021/0383658 A1 | 12/2021 | Chakraborty et al. |
| 2021/0401240 A1 | 12/2021 | Yang et al. |

\* cited by examiner

CLOUD-CONNECTED SMART SENSING AND MEASUREMENT METHOD FOR RESOURCE DISPENSERS

FIELD

Embodiments relate to monitoring and managing a facility having a plurality of end point devices, and, more particularly, to providing a cloud-connected smart sensing and measurement method for a resource dispenser associated with the facility such that the resource dispenser may be remotely monitored and managed.

SUMMARY

In the field of facility or building management, there is a desire to monitor performance of restroom fixtures, such as, for example, faucets, flush valves, hand dryers, floor drains, air or room quality sensors, backflow preventers, bottle fillers, pressure sensors, leak detection sensors, occupancy detection sensors, paper product dispensers (for example, a paper towel dispenser, a toilet paper dispenser, and the like), resource dispensers (for example, a soap dispenser, a sanitizer dispenser, a room deodorizer dispenser, and the like), and the like. As one example, a building manager may want to monitor a resource usage or consumption for one or more restroom facilities within the building. Such monitoring may be performed for predictive maintenance, alerting, for collecting data on usage of the restroom(s), or the like. For example, monitoring may indicate that there is a certain percentage or level of resource remaining for a resource dispenser. As another example, monitoring may generate alerts indicating, for example, a resource level of a resource container (for example, a low resource alert), that a resource dispenser is missing a resource container, and the like.

Accordingly, embodiments described herein provide a system for determining a resource dispenser status of a resource dispenser associated with a facility (for example, a restroom, a building, or the like). Determining and providing the resource dispenser status of a resource dispenser provides a building owner, maintenance personnel, and users with insights into the utilization of the facility and/or resource dispensers therein. Accordingly, the embodiments described herein provides the building owner and users with insights into the resource levels. By understanding the usage and usage patterns allows the maintenance personnel insights into how to optimize their cleaning and maintenance schedules thereby saving time, supplies, cleaning chemicals, and costs. Additionally, providing the resource dispenser status of a resource dispenser allows users to have an overall more pleasant experience by avoiding a situation where a resource dispenser is empty, malfunctioning, or otherwise unavailable.

Additionally, the embodiments described herein enable resource management and efficient operation related data (for example, resource data) to be used with cloud-connected remote monitoring and management. For example, embodiments described herein include an Internet of Things ("IoT") architecture of fixtures (such as faucets, flush-vales, drains, resource dispensers, and the like) that communicates (via end point devices and facility gateways) with a cloud network (for example, a cloud server or the like). The cloud network may then transmit the fixture or resource data to a facility or gateway device (for example, through LoRa WAN RF communication protocols). In some embodiments, the facility device then converts the fixture or resource data and further transmits the data for virtual processing by a remote device, such as a server (for example, a cloud server). The remote device may manipulate, analyze, and provide the data to a user of the system to provide intelligent information on usage, repair needs, preventative maintenance needs, and replenishment needs. As a result, the enterprise may develop efficiencies and receive data on how one or more facilities and/or facility subsystems (including, for example, one or more resource dispensers) are being used to better service and maintain up-time for the fixtures.

For example, one embodiment provides a system for providing a resource dispenser status for a resource dispenser associated with a facility. The system includes an electronic processor. The electronic processor is configured to receive a set of signals. The electronic processor is also configured to compare a first signal included in the set of signals to a set of thresholds. The electronic processor is also configured to determine a resource dispenser status based on the comparison of the first signal to the set of thresholds. The electronic processor is also configured to generate and transmit the resource dispenser status to a remote device, wherein the remote device provides the resource dispenser status to a user.

Another embodiment provides a method for providing a resource dispenser status for a resource dispenser associated with a facility. The method includes receiving a first signal from a first sensing subsystem. The method also includes comparing, with an electronic processor, the first signal to a first threshold, the first threshold associated with a presence of a resource container. The method also includes determining, with the electronic processor, whether the resource container is present based on the comparison of the first signal to the first threshold. The method also includes, in response to determining that the resource container is present in the resource dispenser, comparing, with the electronic processor, the first signal to a second threshold, the second threshold associated with a first sensing level of the resource container, and determining, with the electronic processor, whether the resource is present at the first sensing level of the resource container based on the comparison of the first signal to a second threshold. The method also includes determining, with the electronic processor, a resource dispenser status based on whether the resource container is present in the resource dispenser and whether the resource is present at the first sensing level of the resource container. The method also includes generating and transmitting, with the electronic processor, an electronic message including the resource dispenser status to a remote device, wherein the remote device provides the resource dispenser status to a user.

Yet another embodiment provides a non-transitory computer readable medium storing instructions that, when executed by an electronic processor, perform a set of functions. The set of functions includes receiving a first signal from a first sensing subsystem associated with a first sensing level. The set of functions also includes receiving a second signal from a second sensing subsystem associated with a second sensing level. The set of functions also includes determining whether a resource container is present by comparing the first signal to a first threshold associated with a presence of a resource container. The set of functions also includes, in response to determining that the resource container is present, determining whether a resource is present at the first sensing level by comparing the first signal to a second threshold associated with the first sensing level. The set of functions also includes, in response to determining that the resource is present at the first sensing level, determining whether the resource is present at the second sensing level by comparing the second signal to a third threshold associated with the second sensing level. The set of functions also includes determining a resource dispenser status based on whether the resource is present at the first sensing level and whether the resource is present at the second sensing level. The set of functions also includes generating and transmitting an electronic message including the resource dispenser status to a remote device, wherein the remote device provides the resource dispenser status to a user.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
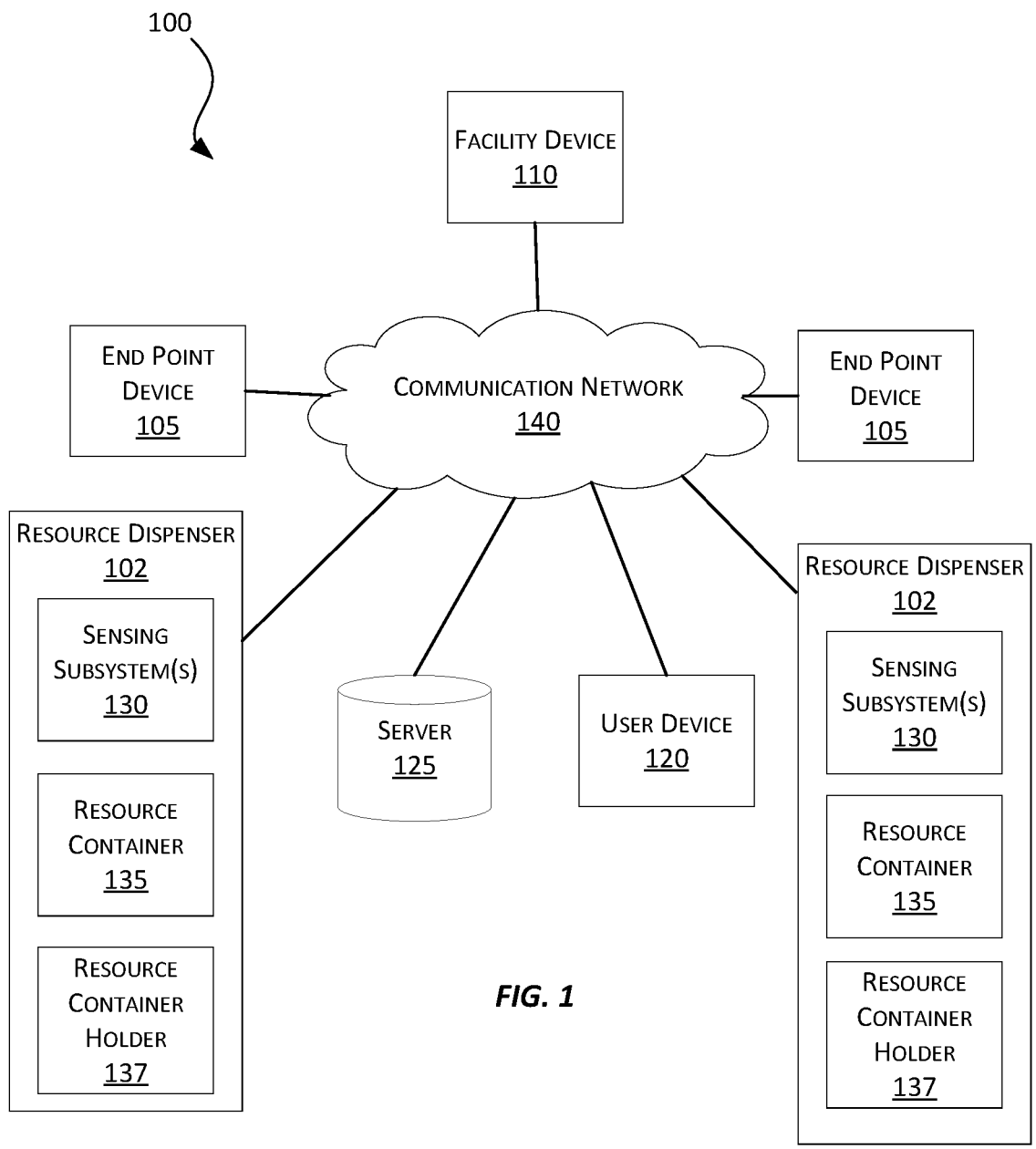
FIG. 1 schematically illustrates a system for providing a resource dispenser status of a resource dispenser associated with a facility according to some embodiments.

FIG. 1 illustrates a system 100 for providing a resource dispenser status of a resource dispenser associated with a facility according to some embodiments. In the illustrated example, the system 100 includes one or more resource dispensers 102 (collectively referred to herein as "the resource dispensers 102" and individually as "the resource dispenser 102"), one or more end point devices 105 (collectively referred to herein as "the end point devices 105" and individually as "the end point device 105"), a facility device 110, a user device 120, and a server 125 (for example, a cloud-based server). In some embodiments, the system 100 includes fewer, additional, or different components than illustrated in FIG. 1 in various configurations. For example, the system 100 may include multiple facility devices 110, user devices 120, servers 125, or a combination thereof. Additionally, the system 100 may include any number of resource dispensers 102, end point devices 105, or a combination thereof and the two resource dispensers and end point devices illustrated in FIG. 1 are purely for illustrative purposes.

A resource dispenser 102 may include a device, mechanism, or system configured to dispense a resource. A resource may include, for example, soap, sanitizer, lotion, disinfectant, sterilizer, antiseptic, germicide, cleanser, fumigant, or another type of cleaning product or resource. As one example, the resource dispenser 102 is a soap dispenser configured to dispense soap (for example, liquid soap, gel soap, foam soap, or the like). As another example, the resource dispenser 102 is a sanitizer dispenser configured to dispense sanitizer, such as hand sanitizer (for example, liquid sanitizer, gel sanitizer, foam sanitizer, or the like). Accordingly, in some embodiments, the resource may be a liquid, a foam, a gel, or another type of material, composition, or consistency.

As illustrated in FIG. 1, in some embodiments, the resource dispenser 102 includes one or more sensing subsystems 130 (collectively referred to herein as "the sensing subsystems 130" and individually as "the sensing subsystems 130"), a resource container 135, and a resource container holder 137. In some embodiments, the resource dispenser 102 includes fewer, additional, or different components than illustrated in FIG. 1 in various configurations. For example, the resource dispenser 102 may include multiple resource containers 135, resource container holders 137, or a combination thereof. As another example, the resource dispenser 102 may include additional components for dispensing a resource (for example, resource dispensing components). However, for the sake of brevity, such resource dispensing components are not described herein.

The resource container 135 is a receptacle or enclosure configured to store (or hold) a resource to be dispensed (via one or more resource dispensing components) to a user. For example, in some embodiments, the resource container 135 is a bottle or another type of rigid or semirigid container made of an impermeable material. For example, the resource container 135 may be made of plastic, glass, or another type of material. The resource container 135 may have various shapes (for example, rectangular, cylindrical, and the like), various sizes (for example, hold different volumes or amounts of resource), or a combination thereof.

The resource container holder 137 is configured to receive the resource container 135. Accordingly, in some embodiments, the resource container 135 is held by (or otherwise coupled to) the resource container holder 137. As one example, when the resource container 135 is empty (i.e., no longer holds a resource), a user may remove the resource container 135 from the resource container holder 137 and install a replacement resource container (for example, a resource container that is full of a resource). Accordingly, in some embodiments, the resource container 135 is temporarily coupled to the resource container holder 137 such that the resource container 1365 is detachable or removeable from the resource container holder 137. Alternatively or in addition, in some embodiments, the resource container 135 is a refillable resource container such that a resource may be added to the resource container 135. As one example, when the resource container 135 has a low resource level or is empty, a user may add resource to the resource container 135. Accordingly, in some embodiments, the resource container 135 may be permanently coupled to the resource container holder 137.

The sensing subsystem 130 is configured to detect or collect data associated with a resource within the resource container 135 (for example, as resource data). In some embodiments, the resource data includes one or more signals detected by the sensing subsystem 130, where a strength of the signal represents or indicates information associated with the resource dispenser 102 (for example, a resource level, a presence of the resource container 135, a material of the resource container 135, or the like), as described in greater detail below. The sensing subsystem 130 may include one or more sensing devices. For example, in some embodiments, the sensing subsystem 130 includes a transmitter and a corresponding receiver. The transmitter is configured to output (or transmit) a signal and the receiver is configured to receive the signal transmitted by the transmitter. In some embodiments, the sensing subsystem 130 detects or collects the resource data using infrared technology. According to such embodiments, the sensing subsystem 130 includes one or more infrared sensors or sensing devices, such as, for example, an infrared transmitter and an infrared receiver. For example, in some embodiments, the transmitter may be, for example, a light emitting diode (LED) transmitter and the receiver may be, for example, a photodiode detector. Accordingly, in some embodiments, the resource data includes one or more infrared signals.

Figure 2:
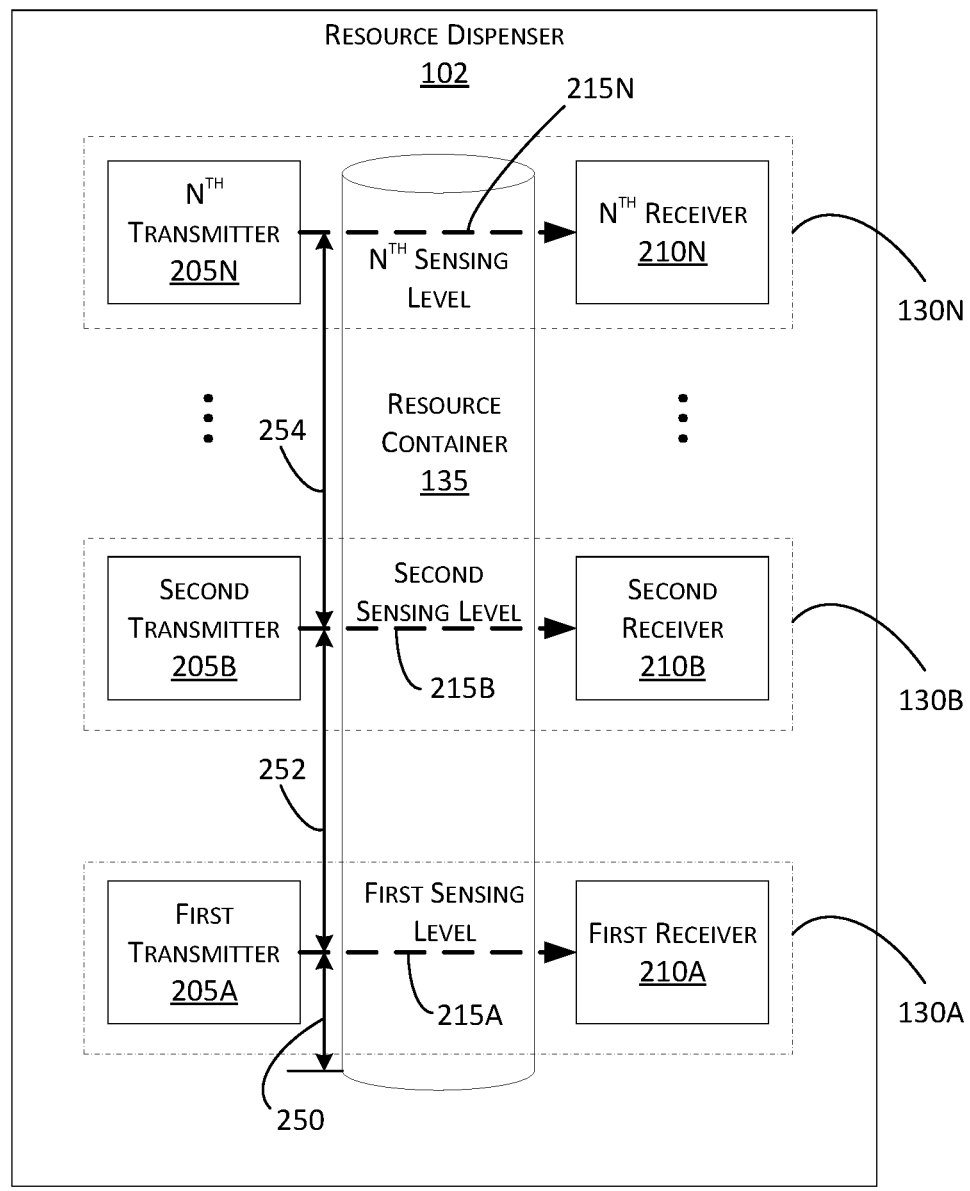
FIG. 2 schematically illustrates a resource dispenser included in the system of FIG. 1 according to some embodiments.

As noted above, the resource dispenser 102 may include multiple sensing subsystems 130, as illustrated in FIG. 2. In the illustrated example, the resource dispenser 102 includes a first sensing subsystem 130A, a second sensing subsystem 130B, and an Nth sensing subsystem 130N. As illustrated in FIG. 2, each sensing subsystem 130 may be associated with a sensing level (for example, a first sensing level, a second sensing level, an Nth sensing level, and the like). A sensing level may refer to a vertical position or location with respect to, for example, the resource container 135. For example, each sensing subsystem 130 may be arranged or positioned at various vertical locations such that each sensing subsystem 130 detects or collects data associated with a different vertical location (for example, a different sensing level) of the resource container 135.

Each sensing subsystem 130 may include a transmitter 205 and a receiver 210. For example, as illustrated in FIG. 2, the first sensing subsystem 130A includes a first transmitter 205A and a first receiver 210A, the second sensing subsystem 130B includes a second transmitter 205B and a second receiver 210B, and the Nth sensing subsystem 130N includes an Nth transmitter 205N and an Nth receiver 210N. Each transmitter 205 transmits (or outputs) a signal 215 that is received by the corresponding receiver 210. For example, as illustrated in FIG. 2, the first transmitter 205A transmits a first signal 215A that is received by the first receiver 210A, the second transmitter 205B transmits a second signal 215B that is received by the second receiver 210B, and the Nth transmitter 205N transmits an Nth signal 215N that is received by the Nth receiver 210N.

Figure 3:
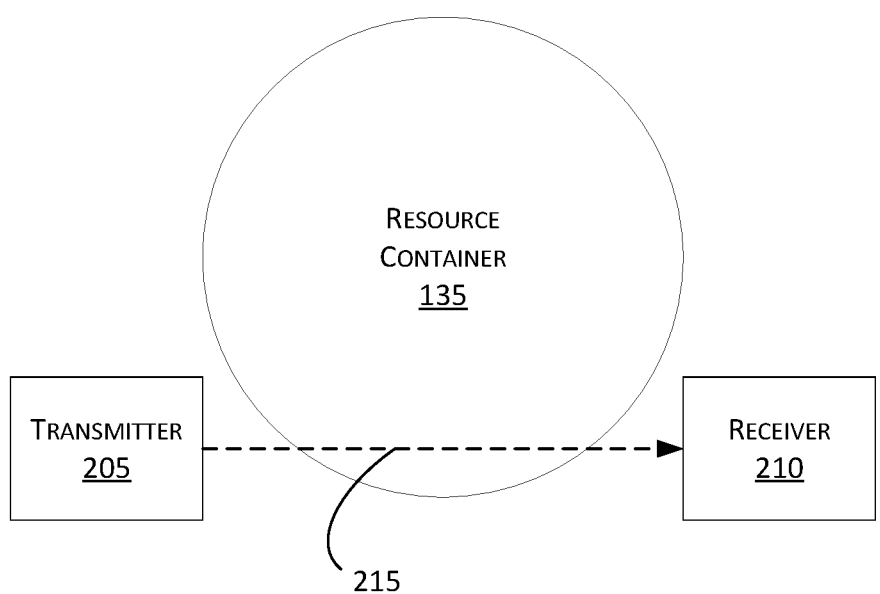
FIG. 3 schematically illustrates a placement of a sensing subsystem with respect to a resource container according to some embodiments.

In some embodiments, the components of the sensing subsystem 130 (for example, the transmitter 205 and the receiver 210) are positioned such that, when the resource container 135 is present, the signal 215 is transmitted through at least a portion of the resource container 135. For example, as illustrated in FIG. 3, the transmitter 205 transmits the signal 215 through at least a portion of the resource container 135 to the receiver 210. Accordingly, in some embodiments, the resource data may include one or more signals detected by the sensing subsystem 130, where the strength of the signal is indicative of whether the signal was transmitted through a resource, a resource container, or a combination thereof.

Accordingly, each of the signals 215 are associated with a different sensing level (for example, a first sensing level, a second sensing level, an Nth sensing level, or the like). As illustrated in FIG. 2, the first signal 215A (for example, the first sensing subsystem 130A including the first transmitter 205A and the first receiver 210A) is associated with a first sensing level. The second signal 215B (for example, the second sensing subsystem 130B including the second transmitter 205B and the second receiver 210B) is associated with a second sensing level. The Nth signal 215N (for example, the Nth sensing subsystem 130N including the Nth transmitter 205N and the Nth receiver 210N) is associated with an Nth sensing level.

A sensing level may define a resource zone or range for the resource container 135. For example, the sensing subsystem 130 may be vertically arranged such that one or more resource zones or ranges are defined with respect to the resource container 135. A resource zone or range may be associated with an amount or level of resource (for example, a resource level) in the resource container 135, such as, for example, a first resource amount or level, a second resource amount or level, and the like. For example, a resource zone may be associated with a low resource level, a medium or intermediate resource level, a high resource level, or the like. A low resource level may indicate that the resource container 135 is low on a resource and should be replenished (for example, the resource container 135 needs to be refilled with the resource or replaced with a resource container that is full of the resource). A medium or intermediate resource level may indicate that the resource container 135 has a medium or intermediate level or amount of resource (for example, the resource container 135 is partially full but may need to be replenished in the near future). A high resource level may indicate that the resource container 135 has a high level or large amount of resource (for example, the resource container 135 is near or at its full capacity of resource and does not need to be replenished). Following the example illustrated in FIG. 2, the first signal 215A (the first sensing level) may define an upper boundary of a first resource zone 250 and a lower boundary of a second resource zone 252. The second signal 215B (the second sensing level) may define an upper boundary of the second resource zone 252 and a lower boundary of a third resource zone 254. The first resource zone 250 may be associated with a low resource level, the second resource zone 252 may be associated with a medium or intermediate resource level, and the third resource zone 254 may be associated with a high resource level.

Figure 4:
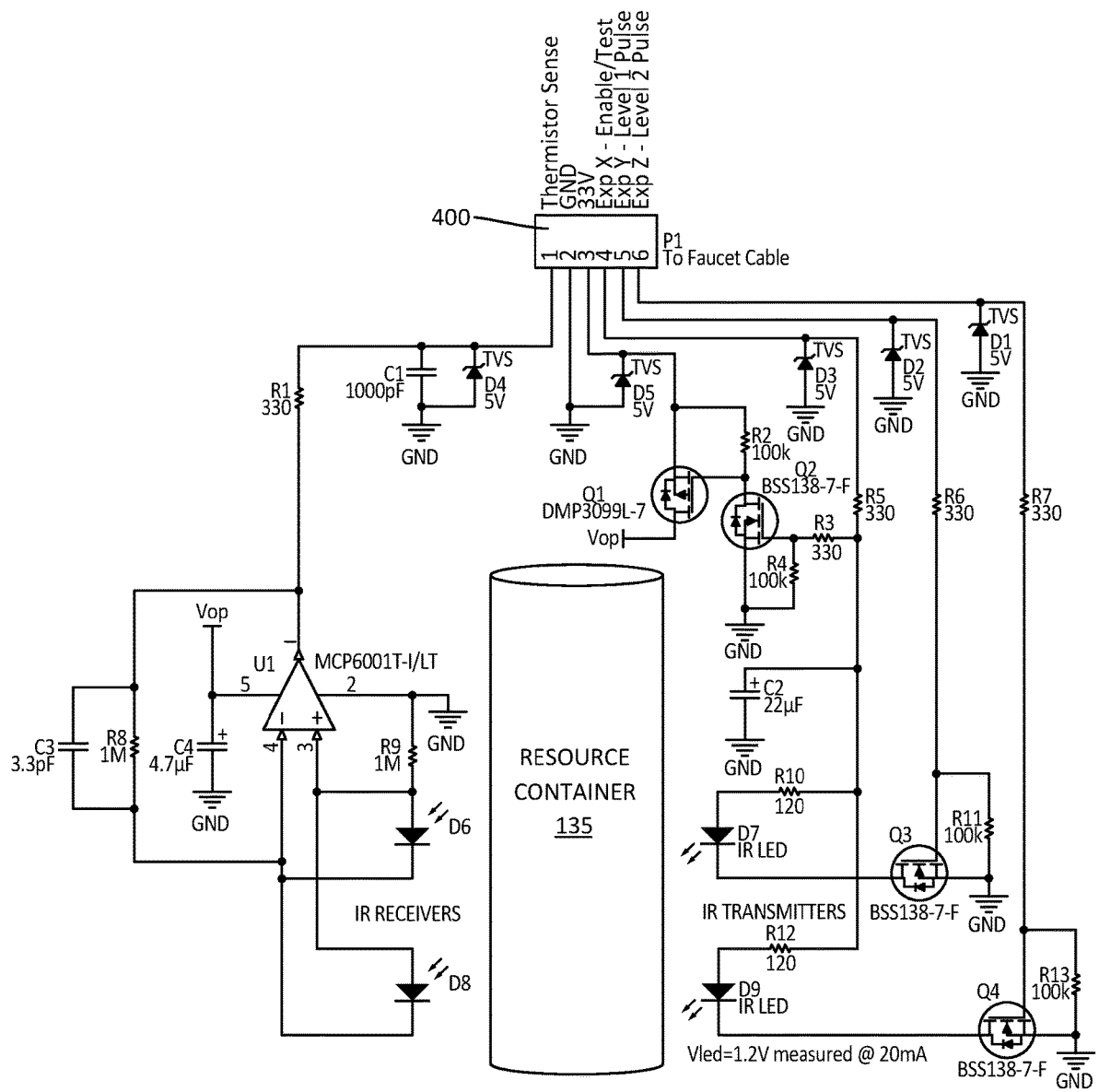
FIG. 4 is an example sensing circuit schematic associated with a resource dispenser included in the system of FIG. 1 according to some embodiments.

FIG. 4 illustrates an example sensing circuit schematic associated with the resource dispenser 102 according to some embodiments. As illustrated in FIG. 4, two photodiode detectors (labeled as D6 and D8 in the circuit schematic of FIG. 4) are implemented as the receivers 210 and two LED transmitters (labeled as D7 and D9 in the circuit schematic of FIG. 4) are implemented as the transmitters 205. In the example illustrated in FIG. 4, a connector 400 interfaces with existing end point circuitry (such as, for example, existing faucet end point circuitry) (for example, as the end point device 105 of the system 100 of FIG. 1). Pin 3 of the connector 400 is supplied with 3.3 volts. During standby, the remaining pins of the connector 400 are at ground potential to minimize battery current draw to below 10µA. During operation, Pin 4 is set to 3.3 volts. Alternatively, pulse-width modulation (PWM) is used to charge capacitor C2 between 1.5 and 3.3 volts. This also powers receiver U1 by way of Q1. Pins 5 and 6 are pulsed high sequentially, each for approximately 1000 to illuminate the LED transmitters (for example, as the signal 215). A 1000 pulse on Pin 5 causes Q3 to conduct and draw current from capacitor C2 through resistor R10 and diode D7 (one of the LED transmitters). Resistor R10 limits the maximum LED current. The voltage at Pin 1 is read with an ADC in the end point (for example, the end point device 105 of system 100 of FIG. 1). As described in greater detail below, the strength of the signal 215 received at the end point device 105 may be used to determine a resource dispenser status, such as, for example, a resource level, a presence of the resource container 135, a material of the resource container 135, and the like.

Returning to FIG. 1, an end point device 105 generally includes a communication link with at least one resource dispenser 102. The end point devices 105 may span multiple facilities, locations, rooms, and the like. In some embodiments, each of the end point devices 105 are associated with (located within) the same facility (for example, a restroom facility). However, in other embodiments, the end point devices 105 are associated with multiple facilities. As one example, a first end point device may be associated with a first facility, and a second end point device may be associated with a second different facility that is either in the same building as the first facility or in an entirely different building.

Figure 5:
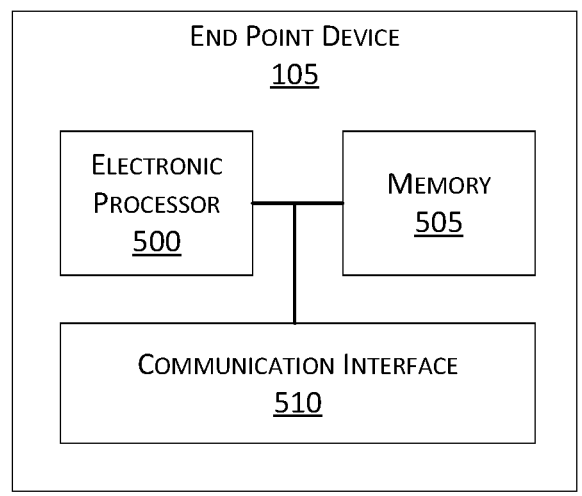
FIG. 5 schematically illustrates an end point device included in the system of FIG. 1 according to some embodiments.

FIG. 5 schematically illustrates the end point device 105 according to some embodiments. In the illustrated example, the end point device 105 includes an electronic processor 500, a memory 505, and a communication interface 510. The electronic processor 500, the memory 505, and the communication interface 510 communicate wirelessly, over one or more communication lines or buses, or a combination thereof. In some embodiments, one or more components of the end point device 105 may be distributed among multiple devices, integrated into a single device, or a combination thereof. In some embodiments, the end point device 105 may perform additional functionality other than the functionality described herein. In some embodiments, the end point device 105 may include additional, different, or fewer components than those illustrated in FIG. 5 in various configurations.

The communication interface 510 allows the end point device 105 to communicate with devices external to the end point device 105. For example, as illustrated in FIG. 1, the end point device 105 may communicate with the resource dispenser 102 (or a sensing subsystem 130 thereof), the facility device 110, the user device 120, the server 125 or a combination thereof through the communication interface 510. The communication interface 510 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the communication interface 510 includes a port for receiving a wired connection between the facility device 110 and the resource dispenser 102 of a corresponding resource dispenser 102. As another example, in some embodiments, the communication interface 510 includes a radio or transceiver for establishing a wireless connection, over a LoRa system or network, between the resource dispenser 102 and the facility device 110.

Figure 6:
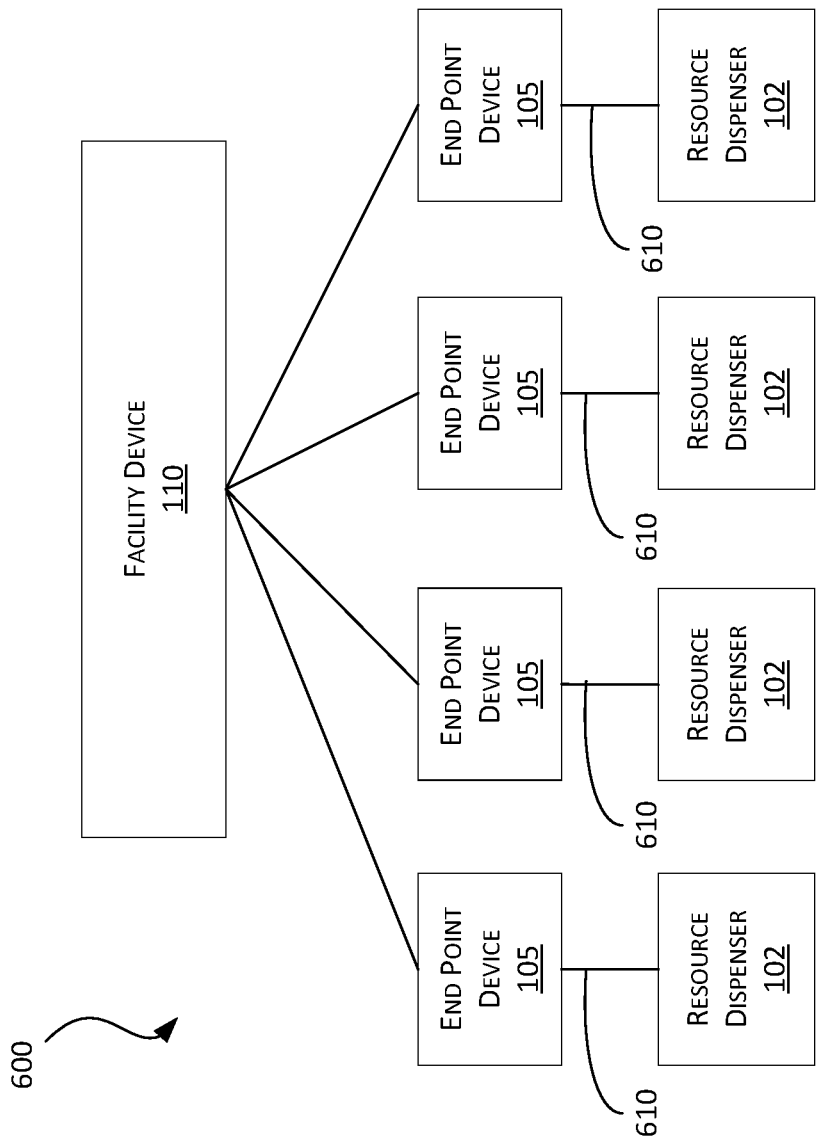
FIG. 6 schematically illustrates a facility according to some embodiments.

The electronic processor 500 includes a microprocessor, an application-specific integrated circuit ("ASIC"), or another suitable electronic device for processing data, and the memory 505 includes a non-transitory, computer-readable storage medium. The electronic processor 500 is configured to access and execute computer-readable instructions ("software") stored in the memory 505. The software may include firmware, one or more applications, program data, filters, rules, one or more program modules, and other executable instructions. For example, the software may include instructions and associated data for performing a set of functions, including the methods described herein. For example, in some embodiments, the electronic processor 500 is configured to enable management and/or monitoring of the resource dispenser 102 (for example, via the sensing subsystem(s) 130 of the resource dispenser 102). In some embodiments, the electronic processor 500 enables management and/or monitoring of the resource dispenser 102 by receiving resource data from the resource dispenser 102, converting the resource data for transmission, and enabling transmission of the converted data to, for example, the facility device 110, the user device 120, the server 125, another component of the system 100, or a combination thereof. Accordingly, in some embodiments, the electronic processor 500 is configured to interact with and collect data associated with the resource dispenser 102 (as resource data) via the sensing subsystem(s) 130. For example, FIG. 6 illustrates an example facility 600 according to some embodiments. As seen in FIG. 6, the facility 600 includes a plurality of end point devices 105 associated with a plurality of corresponding resource dispensers 102. As seen in FIG. 6, the end point devices 105 communicate data (for example, resource data) collected from the corresponding resource dispensers 102 to the facility device 110 (via, for example, one or more communication lines 610).

Returning to FIG. 1, the system 100 also includes the facility device 110. In some embodiments, the facility device 110 serves as a gateway or intermediary device that receives data and forwards the data to another component for processing. As one example, in some embodiments, the facility device 110 receives resource data from the electronic processors 500 of one or more of the end point devices 105 (as illustrated in FIG. 6) and forwards the collected data to another component for processing, such as the server 125, the user device 120, or a combination thereof. Accordingly, in some embodiments, the facility device 110 forwards the data to a remote server (for example, the server 125) for virtual processing, as described in greater detail below. As noted above, in some embodiments, the functionality (or a portion thereof) described as being performed by the facility device 110 may be performed by another remote device or server (not shown).

Although not illustrated in FIG. 1, the facility device 110 may include similar components as the end point device 105, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

Figure 7:
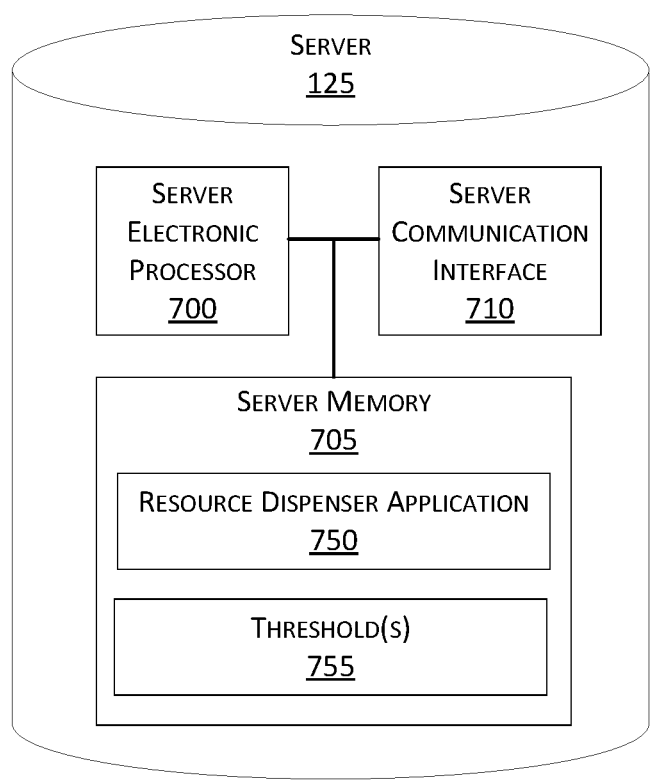
FIG. 7 schematically illustrates a server included in the system of FIG. 1 according to some embodiments.

The server 125 is a computing device, such as a desktop computer, a laptop computer, a tablet computer, a terminal, a smart telephone, a smart television, a smart wearable, or another suitable computing device that interfaces with a user. As illustrated in FIG. 7, the server 125 includes a server electronic processor 700, a server memory 705, and a server communication interface 710. The server electronic processor 700, the server memory 705, and the server communication interface 710 communicate wirelessly, over one or more communication lines or buses, or a combination thereof. In some embodiments, one or more components of the server 125 may be distributed among multiple devices, integrated into a single device, or a combination thereof. In some embodiments, the server 125 may perform additional functionality other than the functionality described herein. Alternatively or in addition, in some embodiments, the functionality (or a portion thereof) described as being performed by the server 125 may be performed by another component of the system 100, such as, for example, the end point device 105, the facility device 110, the user device 120, or a combination thereof. In some embodiments, the server 125 may include additional, different, or fewer components than those illustrated in FIG. 7 in various configurations.

For example, in some embodiments, the server 125 may include multiple electronic processors, multiple memory modules, multiple communication interfaces, or a combination thereof. Also, it should be understood that the functionality described herein as being performed by the server 125 may be performed in a distributed nature by a plurality of computers located in various geographic locations. For example, the functionality described herein as being performed by the server 125 may be performed by a plurality of computers included in a cloud computing environment.

The server communication interface 710 allows the server 125 to communicate with devices external to the server 125. For example, as illustrated in FIG. 1, the server 125 may communicate with the resource dispenser 102 (or a sensing subsystem 130 thereof), the end point device 105, the facility device 110, the user device 120, or a combination thereof through the server communication interface 710. The server communication interface 710 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the server communication interface 710 includes a port for receiving a wired connection between the end point device 105, the facility device 110, the resource dispenser 102, or a combination thereof. As another example, in some embodiments, the server communication interface 710 includes a radio or transceiver for establishing a wireless connection, over a LoRa system or network, between the end point device 105, the facility device 110, the resource dispenser 102, or a combination thereof.

The server electronic processor 700 includes a microprocessor, an application-specific integrated circuit ("ASIC"), or another suitable electronic device for processing data, and the server memory 705 includes a non-transitory, computer-readable storage medium. The server electronic processor 700 is configured to access and execute computer-readable instructions ("software") stored in the server memory 705. The software may include firmware, one or more applications, program data, filters, rules, one or more program modules, and other executable instructions. For example, the software may include instructions and associated data for performing a set of functions, including the methods described herein.

For example, as illustrated in FIG. 7, the server memory 705 stores a resource dispenser application 750 ("the application 750") and one or more thresholds 755 (referred to herein collectively as "the thresholds 755" and individually as "The threshold 755"). The application 750 is configured to enable management and/or monitoring of the resource dispenser 102 (for example, via the sensing subsystem(s) 130 of the resource dispenser 102). In some embodiments, the application 750 (as executed by the server electronic processor 700) accesses or receives data (for example, the resource data) and monitors and manages one or more facilities, including the resource dispenser(s) 102 therein based on the data.

In some embodiments, the server electronic processor 700 (for example, via execution of the application 750) may receive (or access) resource data and process the resource data in order to determine a resource dispenser status for the resource dispenser 102 using one or more of the thresholds 755. A threshold 755 may be associated with an expected or anticipated signal strength of the signal 215 received by the receiver 210. For example, in some embodiments, the threshold 755 is set based on an expected or anticipated amount of infrared signal (or light) to be received by the receiver 210. Additionally, in some embodiments, the threshold 755 is set based on (or taking into account) an error range or tolerance range associated with the expected or anticipated signal strength. The threshold 755 may be a fixed or predetermined threshold (for example, set by a manufacturer or provider of the resource dispenser 102). However, in some embodiments, the thresholds 755 may be adjusted. For example, in some embodiments, a user may set or adjust one or more thresholds 755 using, for example, the user device 120.

The thresholds 755 may include a resource container threshold (for example, a first threshold). The resource container threshold may be set based on an expected or anticipated signal strength to be received by the receiver 210 when the signal 215 is transmitted through the resource container 135. The thresholds 755 may include one or more resource thresholds (for example, a second threshold, a third threshold, and the like). A resource threshold may be set based on an expected or anticipated signal strength to be received by the receiver 210 when the signal 215 is transmitted through the resource container 135 and the resource in the resource container 135. As noted above, the resource dispenser 102 may include multiple sensing subsystems 130 where each sensing subsystem 130 is associated with a different sensing level (for example, the first sensing level for the first sensing subsystem 130A, the second sensing level for the second sensing subsystem 130B, and the like). In such embodiments, each sensing level (or sensing subsystem 130) is associated with a resource threshold. In some embodiments, the resource threshold is the same for each sensing level. However, in other embodiments, the resource threshold is different for each sensing level.

Alternatively or in addition, the server electronic processor 700 may process the resource data in order to determine usage information or patterns associated with the one or more facilities, including the resource dispensers 102 thereof. The server electronic processor 700 may store the resource dispenser status, usage information or patterns, or a combination thereof in, for example, the server memory 705. Alternatively or in addition, the server electronic processor 700 may transmit the resource dispenser status, the usage information or patterns, or a combination thereof (as facility data) to a remote device for storage, such as, for example, a remote storage device or the user device 120. Alternatively or in addition, in some embodiments, the server electronic processor 700 transmits the resource dispenser status, the usage information or patterns, or a combination thereof (as facility data) to a remote device for providing the resource dispenser status, the usage information or patterns, or a combination thereof (as facility data) to a user (for example, via the user device 120).

Returning to FIG. 1, the user device 120 is also a computing device, such as a desktop computer, a laptop computer, a tablet computer, a terminal, a smart telephone, a smart television, a smart wearable, or another suitable computing device that interfaces with a user. Although not illustrated in FIG. 1, the user device 120 may include similar components as the end point device 105 or the server 125, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

A user may use the user device 120 to interact with and access data associated with one or more facilities, such as one or more of the resource dispensers 102 therein (for example, the resource dispenser status determined by the server 125). Accordingly, the user device 120 may be used by an end user, such as a facility entity, to monitor and manage a facility, one or more resource dispensers 102 of a facility, or a combination thereof. As one example, a user may access and interact with the data determined by the server 125 to view resource dispenser statuses, which may allow a facility entity or maintainer insights into, for example, when a resource dispenser needs to be replenished (for example, refilled or replaced), a replenishment or maintenance schedule, and the like. As another example, a user may access and interact with the data determined by the server 125 to view and understand usage patterns, which may allow a facility entity or maintainer insights into, for example, how to optimize cleaning and maintenance schedules, whether there is a need for additional resource dispensers 102, end point devices 105, or a combination thereof. For example, to communicate with the server 125 (i.e., the resource dispenser status, the usage information or patterns, or a combination thereof determined by the server 125), the user device 120 may store a browser application or a dedicated software application executable by an electronic processor for interacting with the server 125.

Figure 8:
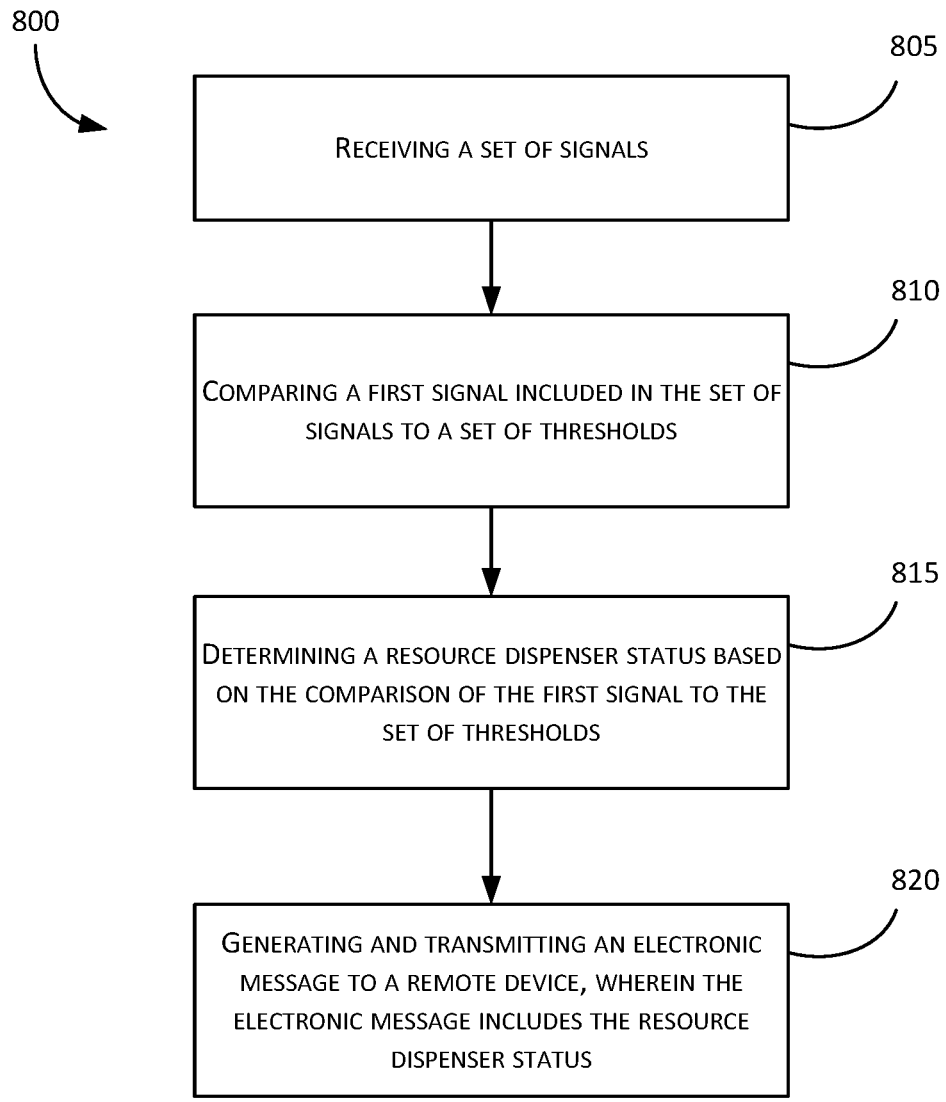
FIG. 8 is a flowchart illustrating a method for providing a resource dispenser status of a resource dispenser associated with a facility using the system of FIG. 1 according to some embodiments.
Figure 9:
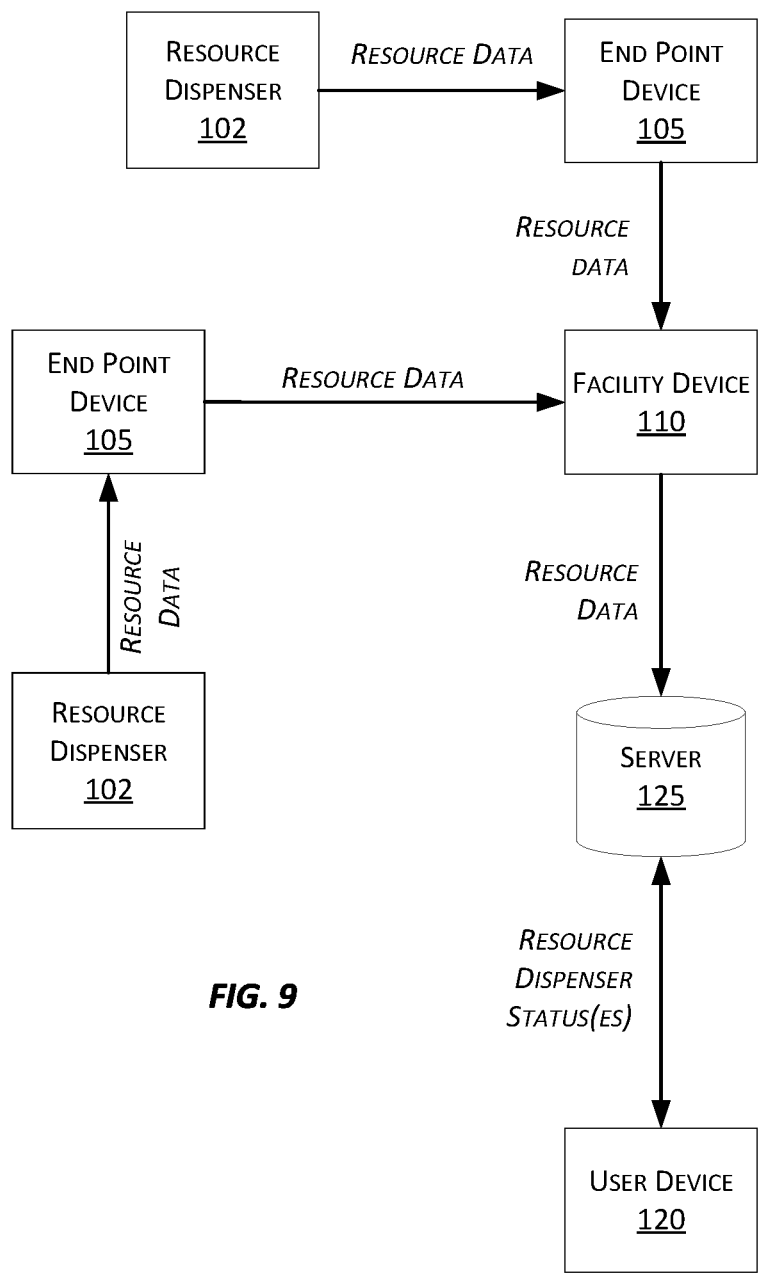
FIG. 9 illustrates example communication between components of the system of FIG. 1 according to some embodiments.

FIG. 8 is a flowchart illustrating a method 800 of providing a resource dispenser status for a resource dispenser 102 associated with a facility according to some embodiments. The method 800 is described herein as being performed by the server 125 (the server electronic processor 700 executing instructions, such as the application 750). However, as noted above, the functionality performed by the server 125 (or a portion thereof) may be performed by other devices, such as, for example, the end point device 105, the facility device 110, the user device 120, another component of the system 100, or a combination thereof. The method 800 is described herein with reference to FIG. 9. FIG. 9 illustrates communication between components of the system 100 according to some embodiments.

As illustrated in FIG. 8, the method 800 includes receiving a set of signals (resource data) (at block 805). As noted above, the resource data includes one or more signals detected by the sensing subsystem 130, where a strength of each signal represents or indicates information associated with the resource dispenser 102 (for example, a resource level, a presence of the resource container 135, a material of the resource container 135, or the like). For example, the strength of each signal may represent or provide information regarding an environment or space in which the signal is transmitted through (for example, a space or environment between the transmitter 205 to the receiver 210). Accordingly, the resource data may be detected or collected by the sensing subsystem 130 of the resource dispenser 102.

As seen in FIG. 9, in some embodiments, the resource dispenser 102 transmits or provides the resource data (for example, as raw data) to the end point device 105 (for example, the electronic processor 500). The end point device 105 may convert the resource data for transmission and enable transmission of the resource data to the facility device 110 (for example, an electronic processor of the facility device 110). The facility device 110 may then forward or transmit the resource data to the server 125 (the server electronic processor 700) through the communication network 140. The server electronic processor 700 may receive the set of signals via the server communication interface 710. Accordingly, in some embodiments, the server electronic processor 700 receives the resource data (the set of signals) from the facility device 110 through the communication network 140. Alternatively or in addition, in some embodiments, the server electronic processor 700 receives the resource data (the set of signals) from another remote device, such as, for example, the resource dispenser 102 (or a sensing subsystem 130 therein), the end point device 105, another component of the system 100, or a combination thereof.

Returning to FIG. 8, the server electronic processor 700 may compare a first signal 215A included in the set of signals to a set of thresholds 755 (at block 810). As noted above, the thresholds 755 may be stored in the server memory 705. Accordingly, the server electronic processor 700 may access one or more thresholds 755 from the server memory 705. As noted above, a threshold 755 may be associated with an expected or anticipated signal strength of the signal 215 received by the receiver 210. The set of thresholds 755 may include a resource container threshold, one or more resource thresholds, or a combination thereof. In some embodiments, the server electronic processor 700 compares the first signal to a resource container threshold (as a first threshold). As noted above, the resource container threshold may be set based on an expected or anticipated signal strength to be received by the receiver 210 when the signal 215 is transmitted through the resource container 135. Accordingly, in order to determine whether the resource container 135 is present in the resource dispenser 102, the server electronic processor 700 compares the first signal to the container threshold. As illustrated in FIG. 2, the first signal 215A is associated with the first sensing subsystem 130A. Accordingly, the server electronic processor 700 may determine whether the resource container 135 is present based on data collected with respect to the first sensing level (for example, the first signal 215A).

Resource containers (for example, the resource container 135) are generally composed of (or made of) opaque materials, such as plastic, and, thus, are generally non-transparent (for example, block light from passing through). Accordingly, given the non-transparent properties of the resource container 135, when the resource container 135 is not present in the resource dispenser 102, the signal 215 (for example, the first signal 215A) received by the receiver 210 will be stronger then when the resource container 135 is present (and blocks the signal 215). In other words, a strong signal strength may indicate that the resource container 135 is not present in the resource dispenser 102. Accordingly, in some embodiments, the resource container threshold is set to a value representative of a strong signal strength. As one example, the signal strength associated with the resource container threshold may be representative of an unobstructed signal transmitted between the transmitter 205 and the receiver 210. Accordingly, in some embodiments, the server electronic processor 700 determines that the resource container 135 is present when the first signal 215A is less than the first threshold. The server electronic processor 700 may determine that the resource container 135 is not present when the first signal 215A is greater than the first threshold.

Alternatively or in addition, in some embodiments, the server electronic processor 700 compares the first signal 215A to one or more resource thresholds (included in the set of thresholds 755). As noted above, a resource threshold may be set based on an expected or anticipated signal strength to be received by the receiver 210 when the signal 215 is transmitted through the resource container 135 and the resource in the resource container 135. Similar to resource containers, resources may also block at least a portion of the signal 215 (or light). Accordingly, when the resource is present at a sensing level, the signal 215 (for example, the first signal 215A) received by the receiver 210 will be weaker than when the resource is not present at the sensing level.

Accordingly, the server electronic processor 700 may compare the first signal 215A to a resource threshold (for example, a second threshold) in order to determine whether a resource is present at the first sensing level. In some embodiments, the server electronic processor 700 determines that the resource is present at the first sensing level in response to the first signal 215A being greater than the resource threshold (the second threshold). The server electronic processor 700 may determine that the resource is not present at the first sensing level in response to the first signal 215A being less than the resource threshold (the second threshold).

In some embodiments, the resource data includes one or more additional signals, such as, for example, the second signal 215B (as illustrated in FIG. 2). In such embodiments, the server electronic processor 700 may compare the second signal 215B to a resource threshold (as a third threshold). As noted above, the resource threshold may be the same or different for different sensing levels (for example, different sensing subsystems 130). Accordingly, in some embodiments the third threshold is the same as the second threshold. However, in other embodiments, the third threshold is different from the second threshold. The server electronic processor 700 may compare the second signal 215B to the third threshold in order to determine whether the resource is present at the second sensing level (as illustrated in FIG. 2). In some embodiments, the server electronic processor 700 determines that the resource is present at the second sensing level in response to the second signal 215B being greater than the resource threshold (the third threshold). The server electronic processor 700 may determine that the resource is not present at the second sensing level in response to the second signal 215B being less than the resource threshold (the third threshold).

After comparing the first signal to one or more thresholds 755 included in the set of thresholds 755, the server electronic processor 700 determines the resource dispenser status for the resource dispenser 102 based on the comparison(s) (at block 815). The resource dispenser status may include, for example, a no resource container status, a resource level status, or a combination thereof. The no resource container status may indicate that the resource dispenser 135 is not present in the resource dispenser 102. The resource level status may indicate that a resource is present at a specific sensing level (for example, the first sensing level, the second sensing level, or the like). As one example, when the server electronic processor 700 determines that the resource container 135 is not present (based on the comparison of the first signal 215A to the first threshold), the server electronic processor 700 may determine that the resource dispenser status for the resource dispenser 102 is a no resource container status. As another example, when the server electronic processor 700 determines that the resource container 135 is present (based on the comparison of the first signal 215A to the first threshold) and that resource is not present at the first sensing level (based on the comparison of the first signal 215A to the second threshold), the server electronic processor 700 may determine that the resource dispenser status for the resource dispenser 102 is a resource level status indicating that there is no resource detected at the first sensing level. According to this example, the resource level status may be a low resource level or an empty resource level, which, ultimately, may indicate that the resource container 135 needs replenishing.

Returning to FIG. 8, the server electronic processor 700 may then generate and transmit an electronic message to a remote device (at block 820). The electronic message may include the resource dispenser status, the resource data, additional data associated with the resource dispenser 102, or a combination thereof.

In some embodiments, the remote device is the user device 120. In response to receiving the electronic message, the user device 120 provides the electronic message to a user such that the user may access and interact with the resource dispenser status, the resource data, additional data associated with the resource dispenser 102, or a combination thereof. As one example, a user may use the user device 120 (or another remote device) to access and interact with the resource dispenser status, the resource data, or a combination thereof. As another example, the user may view and interact with usage patterns (as the additional data associated with the resource dispenser 102), which may allow a facility entity or maintainer insights into, for example, how to optimize cleaning and maintenance schedules (for example, for preventative or predicted maintenance), whether there is a need for additional resource dispensers, and the like. Providing the resource dispenser status, the resource data, additional data associated with the resource dispenser 102, or a combination thereof to users provides a building owner, maintenance personnel, and users with insights into the utilization of the facility and/or resource dispensers therein, insights into the resource levels, and the like. By understanding the usage and usage patterns allows the maintenance personnel insights into how to optimize their cleaning and maintenance schedules thereby saving time, supplies, cleaning chemicals, and costs. Additionally, providing the resource dispenser status of the resource dispenser 102 allows users to have an overall more pleasant experience by avoiding a situation where a resource dispenser is empty, malfunctioning, or otherwise unavailable.

Figure 10:
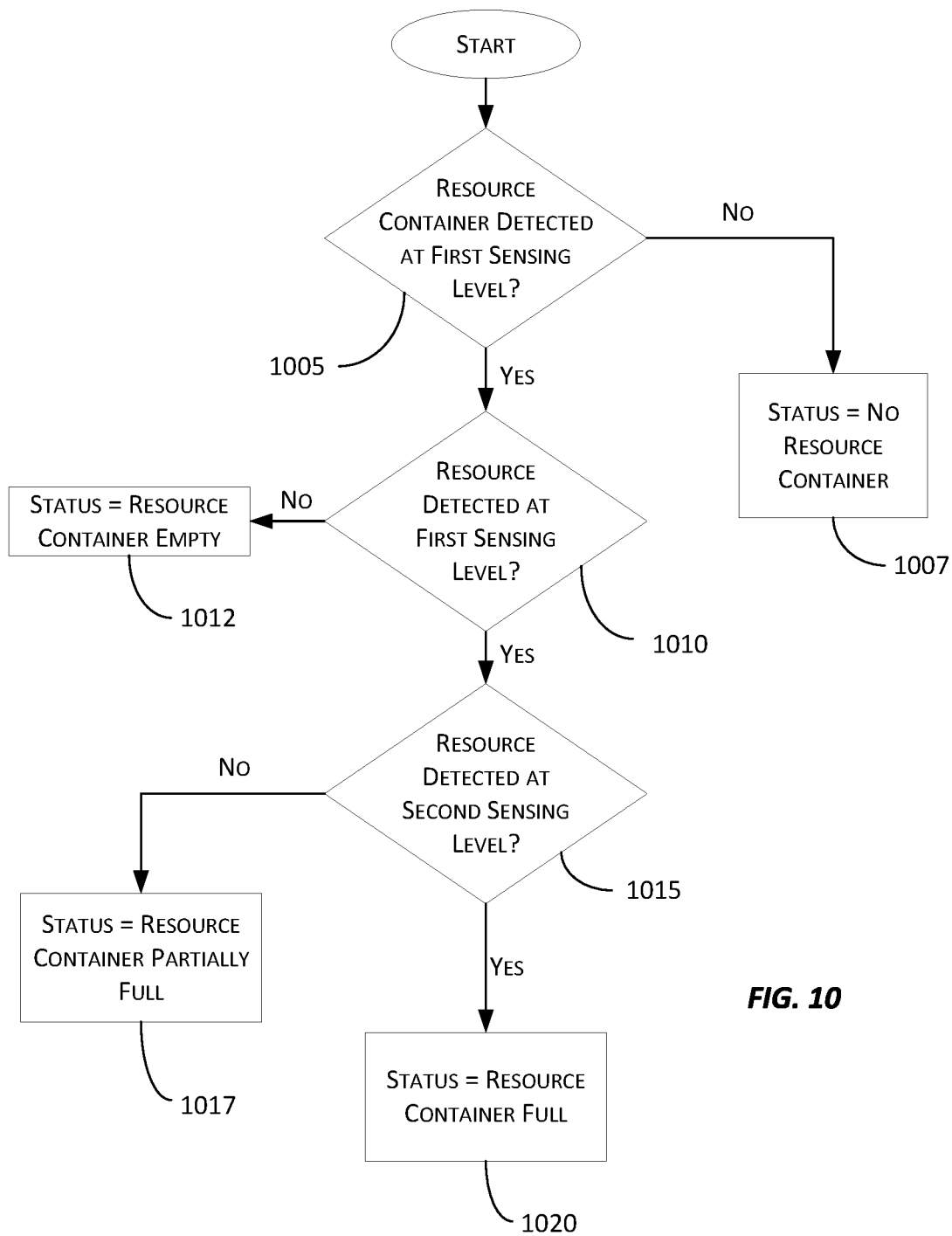
FIGS. 10-11 are flowcharts illustrating example implementations or applications of the method of FIG. 8 according to some embodiments.

FIG. 10 illustrates a flowchart of an example implementation or application of the method 800 of FIG. 8 according to some embodiments. The example of FIG. 10 is described herein as being performed by the server 125 (the server electronic processor 700 executing instructions, such as the application 750). However, as noted above with respect to the method 800 of FIG. 8, the functionality performed by the server 125 (or a portion thereof) may be performed by other devices, such as, for example, the end point device 105, the facility device 110, the user device 120, another component of the system 100, or a combination thereof.

As seen in FIG. 10, the server electronic processor 700 may determine whether the resource container 135 is present in the resource dispenser 102 (at block 1005). As described above, the server electronic processor 700 may determine whether the resource container 135 is present in the resource dispenser 102 by comparing the first signal 215A to the first threshold (for example, the resource container threshold). When the server electronic processor 700 determines that the resource container 135 is not present (No at block 1005), the server electronic processor 700 may determine the resource dispenser status to be the no resource container status (at block 1007), as illustrated in FIG. 10.

When the server electronic processor 700 determines that the resource container 135 is present (Yes at block 1005), the server electronic processor 700 may determine whether a resource is detected at the first sensing level (at block 1010). As described above, the server electronic processor 700 may determine whether the resource is present at the first sensing level by comparing the first signal 215A to the second threshold (for example, the resource threshold). When the server electronic processor 700 determines that the resource is not present at the first sensing level (No at block 1010), the server electronic processor 700 may determine the resource dispenser status to be a resource container empty status (at block 1012), as illustrated in FIG. 10.

When the server electronic processor 700 determines that the resource is present at the first sensing level (Yes at block 1010), the server electronic processor 700 may determine whether the resource is detected at the second sensing level (at block 1015). As described above, the server electronic processor 700 may determine whether the resource is present at the second sensing level by comparing a second signal 215B (as detected by the second sensing subsystem 130B associated with the second sensing level) to a third threshold (for example, the resource threshold). As noted above, the third threshold and the second threshold may be the same or different. When the server electronic processor 700 determines that the resource is not present at the second sensing level (No at block 1015), the server electronic processor 700 may determine the resource dispenser status to be a resource container partially full status (at block 1017), as illustrated in FIG. 10. When the server electronic processor 700 determines that the resource is present at the second sensing level (Yes at block 1015), the server electronic processor 700 may determine the resource dispenser status to be a resource container full status (at block 1020), as also illustrated in FIG. 10.

In some embodiments, the server electronic processor 700 determines whether the resource container 135 is made of glass as part of performing the method 800. As noted above, in some instances, the resource container 135 may be made of materials other than plastic (non-opaque materials), such as glass. Glass is a transparent material. Accordingly, in some embodiments, the server electronic processor 700 determines whether the resource container 135 is made of glass and determines the resource dispenser status based on whether the resource container 135 is glass.

Figure 11:
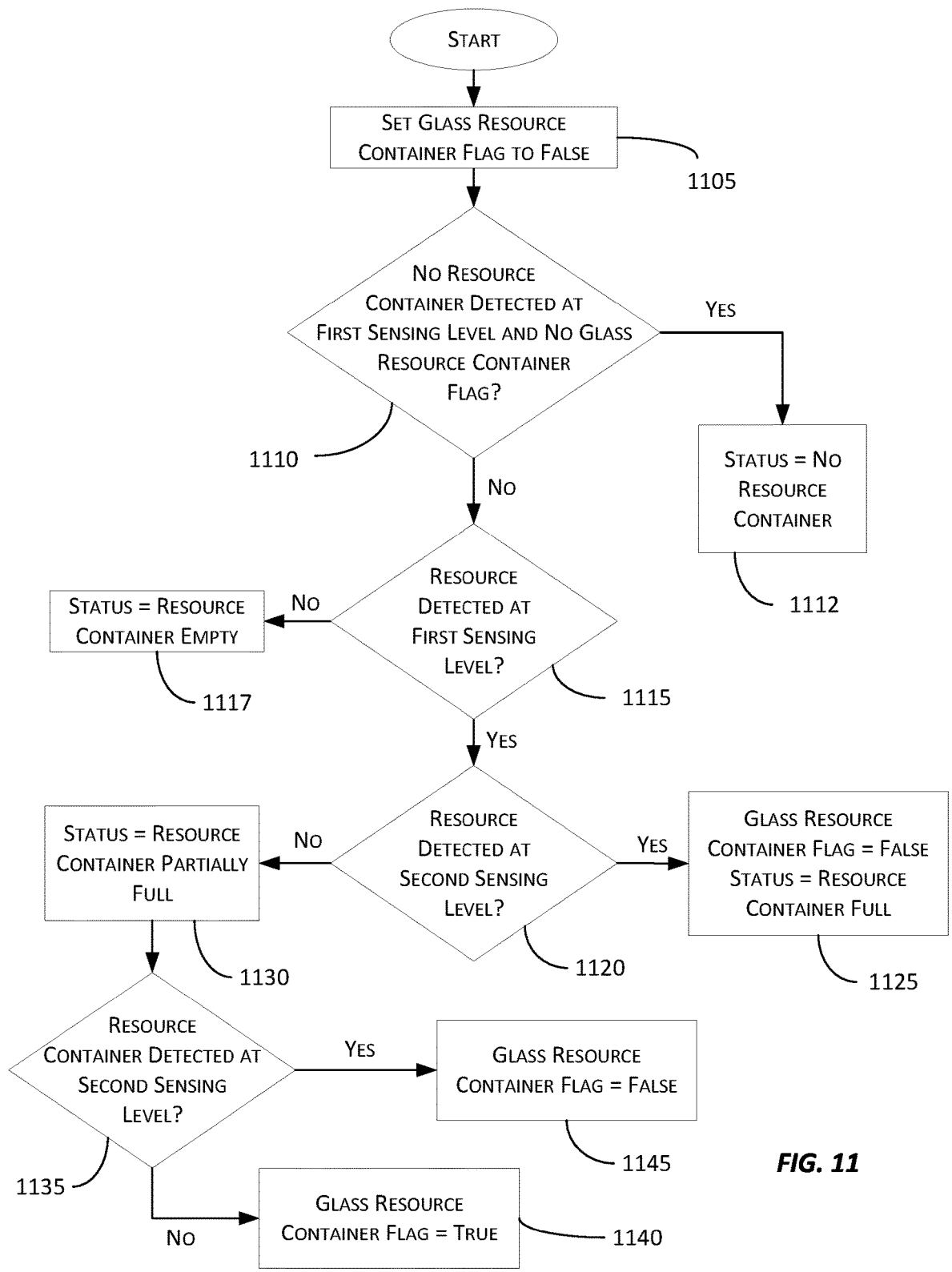

FIG. 11 illustrates a flowchart of an example implementation or application of the method 800 of FIG. 8 that takes into consideration whether the resource container 135 is made of glass (or another transparent material) according to some embodiments. Similar to the example of FIG. 10, the example of FIG. 11 is described herein as being performed by the server 125 (the server electronic processor 700 executing instructions, such as the application 750). However, as noted above with respect to the method 800 of FIG. 8, the functionality performed by the server 125 (or a portion thereof) may be performed by other devices, such as, for example, the end point device 105, the facility device 110, the user device 120, another component of the system 100, or a combination thereof.

As seen in FIG. 11, the server electronic processor 700 initially sets a glass resource container flag to false (i.e., the resource container 135 is not made of glass) (at block 1105). The server electronic processor 700 then determines whether the resource container 135 is present in the resource dispenser 102 and determines whether the glass resource container flag is set to false (at block 1110). As described above, the server electronic processor 700 may determine whether the resource container 135 is present in the resource dispenser 102 by comparing the first signal 215A to the first threshold (for example, the resource container threshold).

When the server electronic processor 700 determines that the resource container 135 is not present and the glass resource container flag is set to false (No at block 1110), the server electronic processor 700 may determine the resource dispenser status to be the no resource container status (at block 1112), as illustrated in FIG. 11.

When the server electronic processor 700 determines that the resource container 135 is present and/or the glass resource container flag is set to true (Yes at block 1110), the server electronic processor 700 may determine whether a resource is detected at the first sensing level (at block 1115). As described above, the server electronic processor 700 may determine whether the resource is present at the first sensing level by comparing the first signal 215A to the second threshold (for example, the resource threshold). When the server electronic processor 700 determines that the resource is not present at the first sensing level (No at block 1115), the server electronic processor 700 may determine the resource dispenser status to be a resource container empty status (at block 1117), as illustrated in FIG. 11.

When the server electronic processor 700 determines that the resource is present at the first sensing level (Yes at block 1115), the server electronic processor 700 may determine whether the resource is detected at the second sensing level (at block 1120). As described above, the server electronic processor 700 may determine whether the resource is present at the second sensing level by comparing the second signal 215B (as detected by the second sensing subsystem 130B associated with the second sensing level) to a third threshold (for example, the resource threshold). As noted above, the third threshold and the second threshold may be the same or different.

When the server electronic processor 700 determines that the resource is present at the second sensing level (Yes at block 1112), the server electronic processor 700 may determine the resource dispenser status to be a resource container full status and may set the glass resource container flag to false (at block 1125), as illustrated in FIG. 11.

When the server electronic processor 700 determines that the resource is not present at the second sensing level (No at block 1120), the server electronic processor 700 may determine the resource dispenser status to be a resource container partially full status (at block 1130), as illustrated in FIG. 11. When the server electronic processor 700 determines the resource dispenser status to be the resource container partially full status (at block 1130), the server electronic processor 700 may also determine whether the resource container 135 is present (or detected) at the second sensing level (at block 1135). The server electronic processor 700 may determine whether the resource container 135 is present at the second sensing level by comparing the second signal 215B to the first threshold (for example, the resource container threshold).

When the server electronic processor 700 determines that the resource container 135 is not present (or detected) at the second sensing level (No at block 1135), the server electronic processor 700 may set the glass resource container flag to true (at block 1140). When the server electronic processor 700 determines that the resource container 135 is present (or detected) at the second sensing level (Yes at block 1135), the server electronic processor 700 may set the glass resource container flag to false (at block 1145).

Thus, the embodiments provide, among other things, methods and systems for monitoring and managing a facility having a plurality of end point devices, and, more particularly, to providing a cloud-connected smart sensing and measurement method for a resource dispenser associated with the facility such that the resource dispenser may be remotely monitored and managed. Various features and advantages of certain embodiments are set forth in the following claims.

What is claimed is:

1. A system for providing a resource dispenser status, the system comprising:
    an electronic processor configured to:
        receive a signal associated with a resource dispenser;
        determine a presence of a resource container by comparing the signal to a first threshold;
        determine a resource dispenser status for the resource dispenser by comparing the signal to a second threshold associated with a presence of a resource at a first sensing level of the resource container; and
        provide the resource dispenser status to a remote device.

2. The system of claim 1, wherein the remote device is configured to provide the resource dispenser status to a user.

3. The system of claim 1, wherein the resource dispenser is associated with a facility.

4. The system of claim 1, wherein the first threshold is associated with the presence of the resource container in the resource dispenser.

5. The system of claim 1, wherein the electronic processor is configured to in response to determining that the resource is present at the first sensing level of the resource container, determine the resource dispenser status by comparing the signal to a third threshold associated with the presence of the resource at a second sensing level of the resource container.

6. The system of claim 5, wherein the resource dispenser status is a first resource level status when the resource is present at the first sensing level and a second resource level status when the resource is present at the first sensing level and the second sensing level.

7. The system of claim 6, wherein the first resource level status is associated with a smaller amount of resource than the second resource level status.

8. The system of claim 1, further comprising:
    a sensing subsystem configured to detect the signal associated with the resource dispenser and comprising:
        a transmitter configured to transmit the signal through the resource container; and
        a receiver configured to receive the signal after passing through the resource container.

9. The system of claim 8, wherein the transmitter comprises an infrared transmitter, wherein the receiver comprises an infrared receiver, and wherein the signal is an infrared signal.

10. The system of claim 8, wherein the electronic processor is configured to receive the signal from the sensing subsystem.

11. A computer-implemented method for determining a resource dispenser status for a resource dispenser, the method being executed by an electronic processor and comprising:
    receiving a signal associated with a resource dispenser;
    determining a presence of a resource container by comparing the signal to a first threshold;
    determining a resource dispenser status for the resource dispenser by comparing the signal to a second threshold associated with a presence of a resource at a first sensing level of the resource container; and
    providing the resource dispenser status to a remote device.

12. The method of claim 11, wherein determining the resource container determined as present when the signal is less than the first threshold and not present when the signal is greater than the first threshold.

13. The method of claim 12, wherein the resource dispenser status is determined as no-resource-container-status when the resource container is not present in the resource dispenser.

14. The method of claim 11, wherein the resource is determined as present at the first sensing level when the signal is greater than the second threshold.

15. The method of claim 11, further comprising:
    in response to determining that the resource is present at the first sensing level of the resource container, determining the resource dispenser status by comparing the signal to a third threshold associated with the presence of the resource at a second sensing level of the resource container.

16. The method of claim 15, wherein the resource is determined as present at the second sensing level when the signal is greater than the third threshold.

17. The method of claim 15, wherein the resource dispenser status is a first resource level status when the resource is present at the first sensing level and a second resource level status when the resource is present at the first sensing level and the second sensing level.

18. The method of claim 17, wherein the first resource level status is associated with a smaller amount of resource than the second resource level status.

19. The method of claim 15, further comprising:
   determining whether the resource container comprises glass by when the signal is less than the first threshold and greater than the second threshold.

20. A non-transitory computer readable medium storing instructions that, when executed by an electronic processor, perform a set of functions, the set of functions comprising:
   receiving a signal associated with a resource dispenser;
   determining a presence of a resource container by comparing the signal to a first threshold;
   determining a resource dispenser status for the resource dispenser by comparing the signal to a second threshold associated with a presence of a resource at a first sensing level of the resource container; and
   providing the resource dispenser status to a remote device.

\* \* \* \* \*